Patented Jan. 8, 1929.

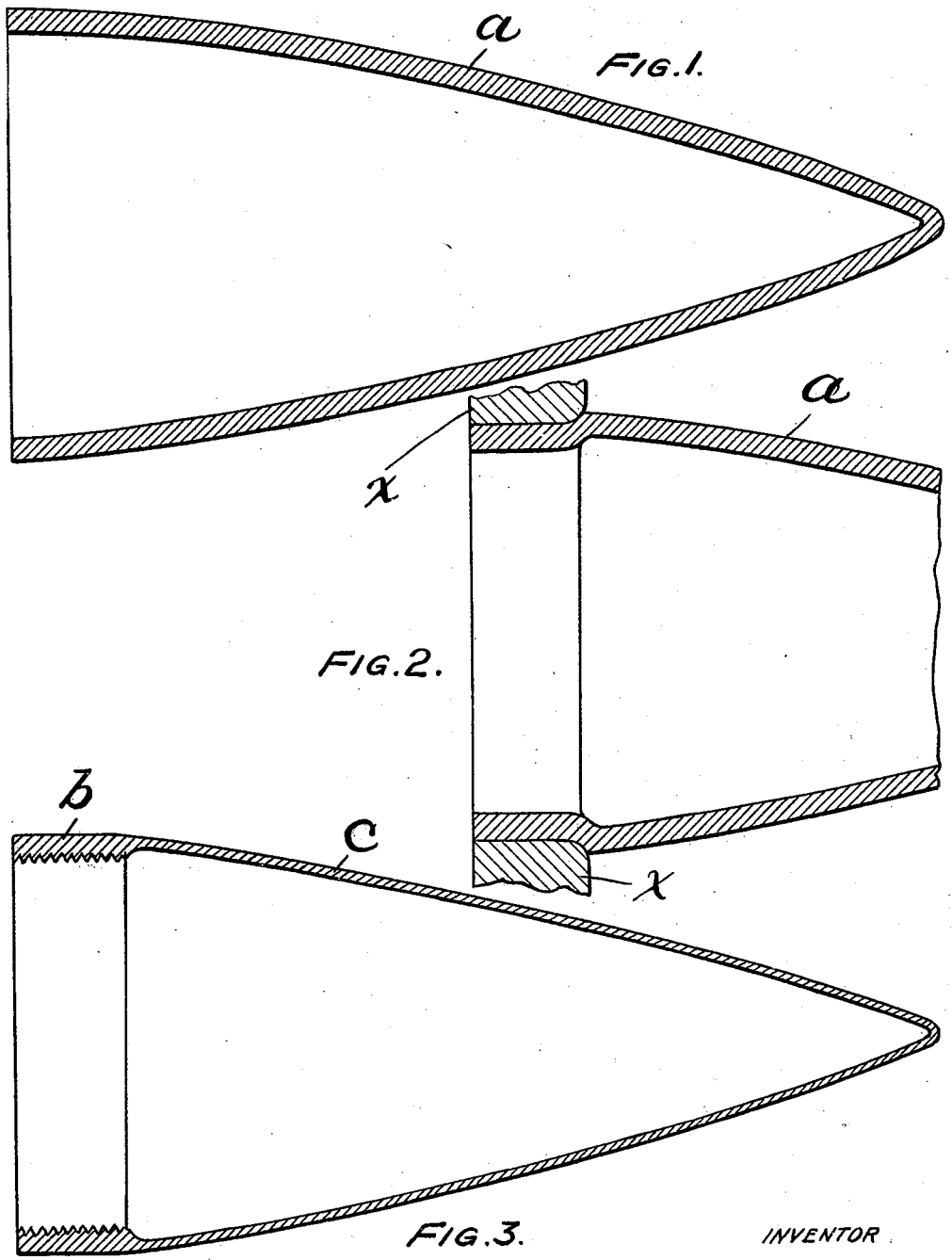

1,698,262

UNITED STATES PATENT OFFICE.

BERNARD M. FINE, OF PHILADELPHIA, PENNSYLVANIA.

PROCESS OF MAKING WINDSHIELDS.

Application filed January 30, 1928. Serial No. 250,382.

My invention relates to windshields for projectiles.

It is customary to provide projectiles with windshields for the purpose of minimizing wind resistance to the flight of the shell. It is desirable that the windshield shall present the following combination of qualities: namely, that it shall be made of drawn steel; that it shall be light in weight and therefore that it shall have a thin wall; that it shall be removably secured, by means of a screw-threaded connection, with the projectile; that it shall be made of a single piece of metal; and that its exterior face shall be smooth from base to point.

The fabrication of a windshield having all these features presents certain obvious difficulties. Thus, it is impracticable to provide the base of a light weight windshield of uniform thickness with a screw thread. The desirable depth of the thread so nearly equals the desirable thickness of the windshield wall that it is impracticable to make the windshield wall of uniform thickness. It would be possible, however, to make the windshield of a single piece of drawn steel of a uniform thickness equal to the desired thickness of the threaded base and then to machine out the inside of the windshield to the desired thinness. This latter operation, however, necessitates the use of expanding tools and is a difficult, expensive and economically impracticable operation.

I have succeeded in fabricating a windshield having the combination of characteristics desired by proceeding in the following manner. A windshield is first made of drawn steel with a wall equal in thickness to that required at the base end for the screw thread. That length of base end required for the thread is then upset inwardly, or "closed-in", throughout the circumference of the windshield, to such radial distance that a prolongation of the outer wall of the upset base end will extend between the inner and outer faces of the main body of the windshield and at a distance from such inner face equal to the desired thickness of the main body of the windshield. The windshield is then machined exteriorly, from the front of its base end to its point, in the plane of this extension or prolongation of the outer face of the base end. Thereby a windshield is formed from a single piece of drawn steel having a desirably thick threaded base end, a desirably thin main body and a smooth exterior from one extremity to the other, while the method of manufacture presents no difficulties and involves no serious expense.

In the drawings:

Fig. 1 is a longitudinal section through a typical blank.

Fig. 2 is a (partial) longitudinal section through the blank after the base end is upset.

Fig. 3 is a longitudinal section through the finished windshield.

The blank $a$, shown in Fig. 1, which may be of any desired length, width and shape, is subjected to the action of a die $x$, which upsets the base end of the shield throughout its circumference and along a length of the windshield equal to, or slightly greater than, the intended length of the screw thread, as shown in Fig. 2. The blank may then be exteriorly machined in the plane of the exterior face of the base end, thereby forming the windshield shown in Fig. 3, which comprises a thick-walled base end $b$ and a thin-walled main body $c$. Usually, a light cut will be taken off the exterior surface of the base end and the main body of the blank machined in the plane of the exterior surface of the machined base end. A screw thread $d$ is then formed in the thick base end, and the windshield is thus finished for attachment to the projectile. If desired, the screw threading operation may precede the machining operation. In place of providing a screw thread, the windshield may be attached to the projectile cap by other methods, such as pinning.

Having now fully described my invention, what I claim and desire to protect by Letters Patent is:

1. The process of making a windshield which comprises forming a drawn blank of tapered shape having a wide base end and of the desired interior shape and dimensions of the main body but of a greater thickness, upsetting inwardly and circumferentially the metal of the wide base end and then removing the excess material from the exterior of the windshield.

2. The process of making a windshield for a projectile, which comprises forming a blank of tapered shape having a wide base end and having a wall of substantially uniform thickness substantially greater than that of the desired thickness of the main body of the finished windshield, upsetting inwardly and circumferentially the metal of the wide base end a radial distance approximating the desired reduction in thickness of the main body of the windshield, and removing metal from the exterior surface of the main body of the blank beyond its upset base end until said face is substantially flush with the exterior face of the base end.

In testmony of which invention, I have hereunto set my hand, at Philadelphia, Pennsylvania, on this 24th day of January, 1928.

BERNARD M. FINE.